T. J. LINDSAY.
LINE FENDERS FOR HARNESS.
No. 195,029. Patented Sept. 11, 1877.
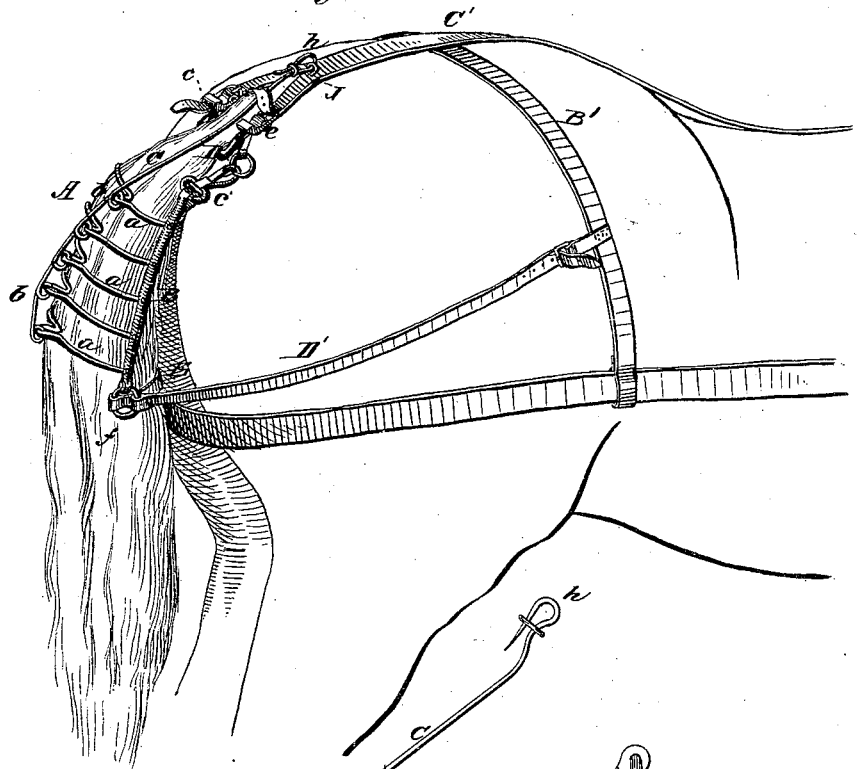
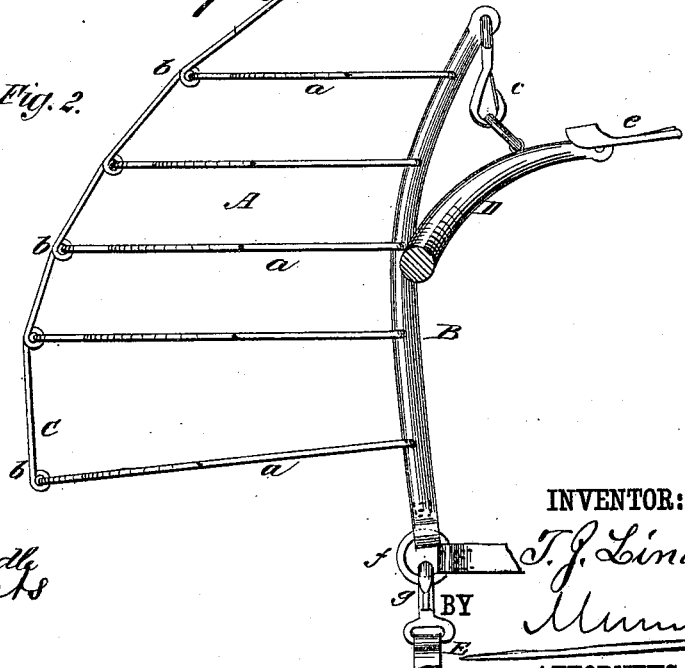
WITNESSES:
Frances McArdle
Alex F. Roberts
INVENTOR:
T. J. Lindsay
BY
ATTORNEYS.

UNITED STATES PATENT OFFICE.

THOMAS J. LINDSAY, OF WINDFALL, INDIANA.

IMPROVEMENT IN LINE-FENDERS FOR HARNESS.

Specification forming part of Letters Patent No. 195,029, dated September 11, 1877; application filed July 9, 1877.

*To all whom it may concern:*

Be it known that I, THOMAS JEFFERSON LINDSAY, of Windfall, in the county of Tipton and State of Indiana, have invented a new and Improved Line-Fender for Harness, of which the following is a specification:

The object of this invention is to prevent a horse, in double or single harness, from getting the lines under his tail; and the nature of my invention consists in a fender or shield which is made of wire or leather, and shaped to fit the upper portion of the tail of a horse, said fender or shield being provided with a tail-strap, side pieces, and other means for properly fastening it to the harness, as will be hereinafter explained.

In the annexed drawing, Figure 1 shows my improvement applied to a horse. Fig. 2 is a sectional detail.

Similar letters of reference indicate corresponding parts.

The letter A designates the improved fender, which is composed of wires $a$, bent in the form of semicircles, varying in diameter and connected at their ends with side pieces B B.

At the middle of the length of the wires $a$ they are connected to a stay-wire, $c$, by means of loops and eyes $b$, as clearly shown in the drawings.

D designates the crupper, which is connected by snap-hooks C to the side pieces B B, and to the back-strap C' by buckles $e$ $e$.

The lower ends of the side pieces B B have rings $ff$ fastened to them, to which are attached straps D D and E.

The straps D D are extended forward and buckled to the hip-strap B', and the strap E is permanently attached to one of the rings $f$, and fastened to the other ring by means of a snap-hook, $g$.

J designates an eye, which is fastened to the back-strap C', and to which is attached, by a hook, $h$, the upper end of the stay-wire $c$.

To prevent the stay-wire from casual detachment from the eye J a ring is slipped on the hook $h$, as shown in both figures.

These attachments which I have above described secure the fender A to the harness so that it will be comfortable to the animal. If desired the side straps D D may be attached to the tugs or to the back band.

The stay-wire $c$ may be omitted, but I prefer to use it to keep the fender-wires in their proper places.

Having thus described my invention, I claim as new and desire to secure by Letters Patent—

1. The fender consisting of the side pieces B B, transverse wires $a$, and stay-wire $c$, all arranged as herein set forth, and adapted for attachment to a harness-crupper, for the purpose specified.

2. The tail-strap E, provided with a snap-hook, $g$, in combination with the fender A, substantially as described.

3. The side straps D D, combined with the fender A and tail-strap E, substantially as described.

THOMAS JEFFERSON LINDSAY.

Witnesses:
SAMUEL BARROW,
H. W. SWAIN.